US010363666B2

(12) United States Patent
Bosscher et al.

(10) Patent No.: US 10,363,666 B2
(45) Date of Patent: Jul. 30, 2019

(54) ROBOTIC SYSTEM WITH HAPTIC CUTTING TOOL (71) Applicant: HARRIS CORPORATION, Melbourne, FL (US)

(72) Inventors: Paul M. Bosscher, West Melbourne, FL (US); Matthew D. Summer, Melbourne, FL (US); Michael E. Bowman, Satellite Beach, FL (US); Nicholas Murphy-DuBay, Melbourne, FL (US); Loran J. Wilkinson, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 854 days.

(21) Appl. No.: 14/729,770

(22) Filed: Jun. 3, 2015

(65) Prior Publication Data
US 2016/0354932 A1 Dec. 8, 2016

(51) Int. Cl.
B25J 15/08 (2006.01)
B25J 13/02 (2006.01)
B26D 5/00 (2006.01)
B25J 15/00 (2006.01)
B25J 5/00 (2006.01)
(Continued)

(52) U.S. Cl.
CPC ............ B25J 13/025 (2013.01); B25J 5/005 (2013.01); B25J 11/0025 (2013.01); B25J 13/082 (2013.01); B25J 13/084 (2013.01); B25J 15/0028 (2013.01); B25J 15/0052 (2013.01); B25J 15/0066 (2013.01); B26D 5/007 (2013.01)

(58) Field of Classification Search
CPC .. B25J 15/0066; B25J 11/0025; B25J 13/082; B25J 13/084; B25J 15/0028; B25J 15/0052; B25J 13/025
See application file for complete search history.

(56) References Cited

U.S. PATENT DOCUMENTS 8,523,043 B2    9/2013  Ullrich et al.
8,942,828 B1*   1/2015  Schecter .................. A61N 1/05
                                                607/116
(Continued)

OTHER PUBLICATIONS

Okamura, A.M., et al., "The Haptic Scissors: Cutting in Virtual Environments," Proceedings of the 2003 IEEE, International Conference on Robotics Automation, Taipei, Taiwan, Sep. 14, 19, 2003., 0-7803-7736-2/03 copyright 2003 IEEE.
(Continued)

Primary Examiner — David M Fenstermacher
Assistant Examiner — Randell J Krug
(74) Attorney, Agent, or Firm — Fox Rothschild LLP; Robert J. Sacco; Carol E. Thorstad-Forsyth (57) ABSTRACT Robotic system includes a control system and a slave device which is controlled by the control system. The slave device has a robotic grasping device formed of a rigid base and at least one finger which is movable to facilitate grasping of objects. At least one sensor is provided which senses a force applied to the finger. A cutting tool having a cutting jaw is also attached to the base. The cutting jaw is arranged to pivot on a pivot axis responsive to a pivot motion of the finger. The forces exerted on the cutting jaw are sensed with the sensor during a first predetermined range of finger motion associated with a cutting mode of operation.

14 Claims, 9 Drawing Sheets (51) Int. Cl.
*B25J 13/08* (2006.01)
*B25J 11/00* (2006.01)

(56) References Cited

U.S. PATENT DOCUMENTS

| | | | |
|---|---|---|---|
| 9,144,431 B2* | 9/2015 | Friedman | A61B 5/0402 |
| 2011/0107842 A1* | 5/2011 | Dargahi | G01N 3/40 |
| | | | 73/780 |
| 2016/0089176 A1* | 3/2016 | Deodhar | A61B 17/295 |
| | | | 606/174 |

OTHER PUBLICATIONS

Covarrubias, M., et al., "Supporting Unskilled People in Cutting Tasks Through Haptic Guidance," La Medicina Incontra la Realta Virtuale, Nov. 3, 2011.
Kremer, K. "Robotics Refueling Research Scores Huge Leap at Space Station," Universe Today, Mar. 24, 2012.

* cited by examiner

ROBOTIC SYSTEM WITH HAPTIC CUTTING TOOL

BACKGROUND OF THE INVENTION

Statement of the Technical Field

The inventive arrangements relate to telematic systems and more particular to cutting tools used in conjunction with telematic systems.

Description of the Related Art

In the field of robotics, hand operated user interface controls generate one or more control signals which are then used for actuating various motion operations of the robot. The control system of the robot will respond to these control signals by activating certain servo-motors, solenoids, or other devices within the robotic manipulator to produce the desired motion. Video cameras can be used to provide visual information to a remote operator regarding a work piece and/or the environment surrounding the robotic manipulator.

Haptic technology or haptics involves tactile feedback provided by a device to a user. The tactile feedback is typically provided by applying forces, vibrations and/or motions to one or more portions of a user interface device. Haptics are sometimes used to enhance remote control devices associated with robotic devices. In such systems, sensors in the robot slave device are used to detect forces exerted upon such device. The information relating to such forces is communicated to a control unit, where the information is used to generate suitable tactile feedback for a user.

Unmanned Ground Vehicles (UGVs) are used by police and military to counter improvised explosive devices (IEDs) around the world. When UGVs are used in this context, an important application involves the defeat the IED by rendering it safe and preserving forensic evidence. Defeating the IED in this way allows for the collection of DNA, fingerprints, chemical signatures, and so on. The process of defeating an IED often involves utilization of a robotic arm which is attached to the UGV. Among other important tasks, the robotic arm is used to position and operate a wire-cutting tool.

SUMMARY OF THE INVENTION

Embodiments of the invention concern a robotic system. The robotic system is comprised of a control system which includes a user interface device. The robotic system also includes a slave device which is controlled by the control system. The slave device has a robotic grasping device formed of a rigid base and at least one finger which is movable to facilitate grasping of objects. The finger is pivotally mounted to the base at a proximal end and has an elongated length which extends away from the rigid base to a distal end. At least one sensor is provided which senses a force applied to the finger. A cutting tool having a cutting jaw is attached to the base. The cutting jaw is arranged to pivot on a pivot axis responsive to a pivot motion of the finger. The forces exerted on the cutting jaw are sensed with the sensor during a first predetermined range of finger motion associated with a cutting mode of operation.

According to one aspect, a shield is arranged to mechanically interact with the cutting jaw and selectively prevent the cutting jaw from exerting a force on the finger during a second predetermined range of finger motion different from the first range. A mechanical coupling between said shield and the finger causes the shield to rotate about a shield pivot axis in coordination with the pivot motion of the finger.

The user interface device includes a hand grip with a human finger-operated trigger control. According to a further aspect, the control system selectively generates finger control signals that cause the finger to pivot in a first direction responsive to pulling the trigger toward the hand grip when the control system is in the cutting mode, and pivot in a second direction, opposite the first direction, responsive to pulling the trigger toward the hand grip when the control system is in the grasping mode. The first direction is defined as a rotation of the finger toward the cutting jaw, and the second direction is defined as a rotation of the finger away from the cutting jaw.

The control system is arranged to generate haptic control signals responsive to forces detected by the sensor. The user interface device is arranged to exert a haptic force upon an operator responsive to the haptic control signals. According to one aspect of the invention, the direction of the haptic force applied to the human finger-operated trigger control by the control system in response to the sensor is automatically reversed in the cutting mode as compared to the grasping mode.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

The process of defeating an IED often involves utilization of a robotic arm which is attached to a UGV. Among other important tasks, the robotic arm is used to position and operate a cutting tool, such as a bypass or anvil type cutter. The cutting tool can be held in a robot gripper disposed at a distal end of the robotic arm. Alternatively, cutting tools can be mounted or attached to a gripper assembly.

Some wires/cables are difficult to completely sever. For example, fiber-optic cables often have thin insulating or protective fibers that are disposed between the optical guide and a sheath that surrounds it. These fibers can prevent the two portions of an optical cable from fully separating despite the fact that the optical waveguide portion of the cable has in fact been cut. In such a scenario, it is often difficult for an operator to visually determine if the optical fiber has been severed because the insulating fibers prevent the cable from completely separating, even though the optical waveguide may be completely severed. If it cannot be visually confirmed that the conductor is cut, an operator (e.g. a bomb disposal technician) must defeat the IED manually. Accordingly, the ability to determine that a wire or cable has been severed is important when attempting to disable an IED.

When a technician cuts a wire or cable by hand, the cutting action is often accompanied by an audible snap or mechanical feedback which can be felt through the grips of the tool. But when using a robotic arm to position and control a cutting tool (e.g. a wire cutting tool), it is often difficult for an operator to determine if the wire or cable has been successfully cut. Haptic systems associated with robotic grippers can provide tactile feedback to an operator who is controlling the gripper. Accordingly, when a cutting tool is held or grasped by the gripper, such haptic systems can potentially offer some haptic feedback to the operator which can be useful for determining when a wire or cable has been successfully cut. However, such an arrangement is still not ideal because, when a cutting tool is being grasped by the robotic gripper, the gripper cannot be used for any other grasping purpose.

The inventive arrangements facilitate tactile confirmation of successful wire or cable cutting when using a robotic arm to control a cutting tool, while preserving the availability and function of a robotic grasping device disposed on the robotic arm. This advantageous function is achieved without necessarily increasing the number of haptic sensors because the arrangement takes advantage of existing haptic sensors associated with the grasping device.

Figure 1:
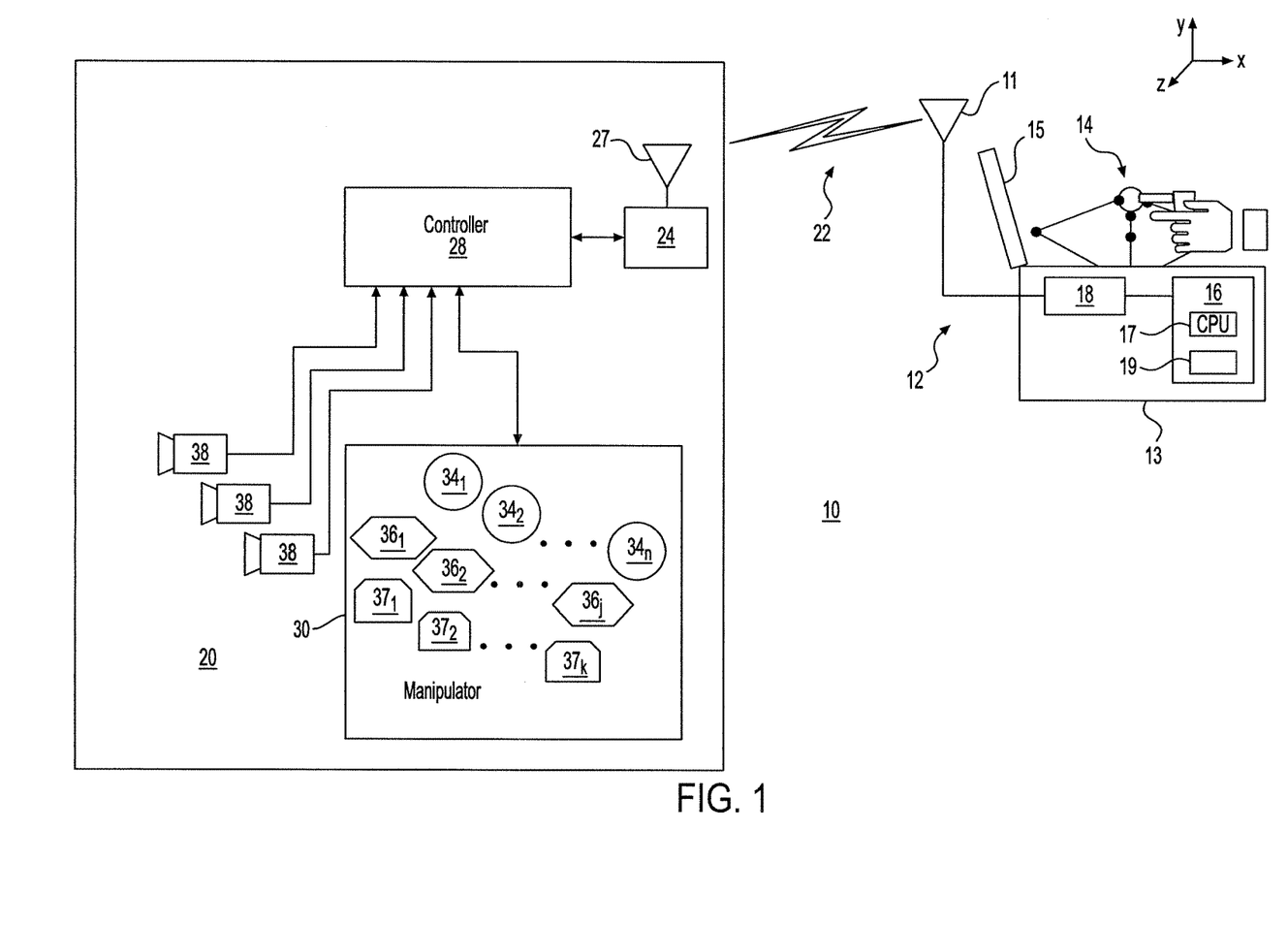
FIG. 1 is a block diagram of a robotic system including a haptic cutting tool that is useful for understanding the inventive arrangements.

Referring now to FIG. 1, there is provided a simplified block diagram showing a robotic system 10 that includes a control system 12 and a slave device 20. A data link 22 (e.g., a wireless data link) allows the control system 12 to communicate commands to slave device 20, and allows the control system to receive information from the slave device 20. For example, such information can include images from video cameras, haptic feedback data; and other information (e.g. battery related information) pertaining to the operational status of the slave device.

The control system 12 can include a hand operated user interface control 14, data processing system 16, and a data transceiver 18 to support the data link 22. In some embodiments, the hand operated user interface control 14 can sense hand movement along one, two or three linear directions of motion defined by orthogonal axes x, y, and z. The hand operated user interface control in some embodiments can also sense rotational hand movement around one, two or three rotational axes.

Data processing system 16 includes a data processing hardware element such as a central processing unit (CPU) 19 that is programmed with a set of instructions. Alternatively, a different type of data processing hardware element can be used, such as an Application Specific Integrated Circuit (ASIC). The data processing system can also include a memory or data storage device 19 for storing a set of instructions. In some embodiments, the data processing system 16 is fully integrated with the hand operated user interface control 14. For example, the data processing system 16 could be integrated into a base 13 associated with the hand operated user interface control. The data processing system 16 can be operatively connected to a display unit 15 as shown for purposes of displaying video images. In some embodiments, the display unit can be integrated with the control system 12 as shown. However, the invention is not limited in this regard, and a separate video display unit (not shown) can also be used with the data processing system.

Data transceiver 18 is operatively coupled to the data processing system. The data transceiver can include any type of wired or wireless transceiver suitable for communicating data to and from a data transceiver 24 provided in slave device 20. If data transceivers 18, 24 are wireless devices then antennas 11, 27 can be respectively coupled to the data transceivers. A suitable wireless data link interface can be based on any of a variety of well-known wireless interface standards. Examples of such well known wireless interface standards can include the Bluetooth wireless standard, and the IEEE 802.11 family of standards. However, the invention is not limited in this regard and any other wireless interface standard can be used. Data communicated over the data link 22 can include motion control commands directed to slave device 20, feedback data communicated from slave device 20 to the data processing system 16, and video data communicated from the slave device 20 to the data processing system 16.

The slave device 20 is a robot system capable of performing moving, manipulating and/or grasping actions based on telematic commands received from control system 12. Slave device 20 includes onboard computer processing hardware and/or other circuitry for processing motion control commands and communicating feedback data to data processing system 16. For example, slave device 20 can advantageously include an on-board controller 28. The on-board controller 28 can be any suitable type of processing device such as a microprocessor, microcontroller, application specific integrated circuit, and so on. The on-board controller 28 can further include software, firmware or other programming for carrying out the methods described herein. The on-board controller 28 performs communication operations involving data transceiver 24.

Figure 2:
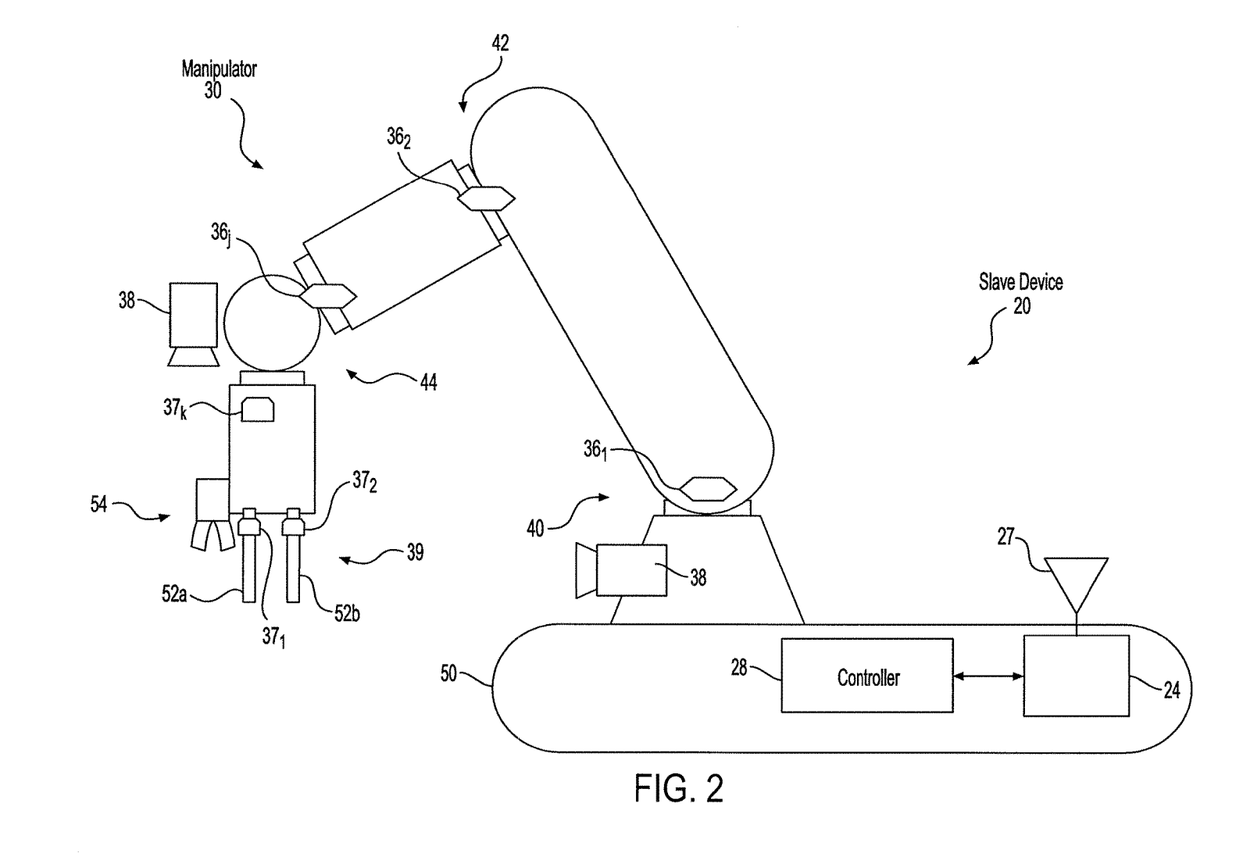
FIG. 2 is a schematic representation of a robot slave device that is useful for understanding the inventive arrangements.

Slave device 20 includes a manipulator 30 which is remotely controlled using the control system 12. According to some embodiments, the manipulator can be a remotely controlled manipulator arm which includes one or more mechanical joints. For example, such an embodiment of slave device 20 is shown in FIG. 2. The manipulator arm 30 can include a grasping device 39 at a distal end of the arm that is remote from a slave device base 50. Manipulator arms of this type are generally known in the art and therefore will not be described here in detail. However, a brief description of one embodiment of a manipulator 30 is provided to help understand the invention.

The manipulator 30 can include one or more servos $34_1$, $34_2, \ldots 34_n$ or other suitable motivating devices for moving one or more mechanical joints 40, 42, 44 of the manipulator in a direction and at a velocity determined by the motion control command signals. One or more of the servos can also be used to operate the grasping device 39 for grasping objects. Feedback information communicated from slave device 20 to control system 12 can include position information with regard to the one or more mechanical joints of the manipulator 30. The position information can be provided by one or more sensors $36_1, 36_2, \ldots 36_j$. For example, in FIG. 2, sensors $36_1, 36_2, \ldots 36_j$ are provided at each of movable joints 40, 42, 44. One or more sensors can also be provided to movable portions of the grasping device 39. These sensors can be arranged for sensing position and/or forces experienced by the manipulator and/or grasping device. For example, one or more sensors $37_1, 37_2, \ldots 37_k$ can be used for this purpose. The sensors can detect a position of fingers 52a, 52b and/or a force exerted upon grasping device fingers 52a, 52b. In FIG. 2, three force sensors are shown associated with grasping device 39, but the invention is not limited in this regard. More or fewer sensors can be provided.

The data from the sensors $36_1, 36_2, \ldots 36_j$ and $37_1, 37_2, \ldots 37_k$ is communicated to the on-board controller 28, which performs any necessary data formatting before communicating the data to data transceiver 24. The information is then communicated by data transceiver 24 to the control system 12. One or more cameras 38 can be attached to a portion of a manipulator and video information from the cameras can similarly be communicated to the control system 12. As may be observed in FIG. 2, the grasping device 39 according to the inventive arrangements can further include a cutting tool 54.

Figure 3:
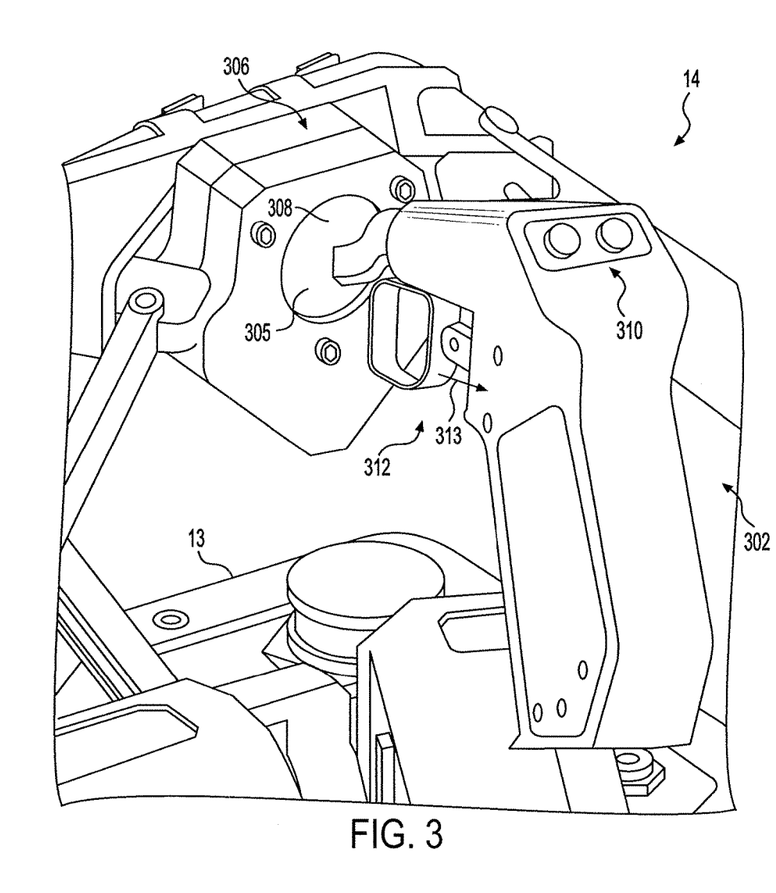
FIG. 3 is a drawing of a hand operated user interface control for a robotic system that is useful for understanding the inventive arrangements.

Referring now to FIG. 3, a hand operated user interface control 14 as described herein can be comprised of a movable hand grip 302. For example, the hand grip can be attached to a pivot member 305 which is disposed in a housing 306 associated with the user interface control. The pivot member can include a ball 308 which is configured to roll, pitch and yaw about a pivot point. In such a scenario, one or more sensors (not shown) can detect rotational motion of the ball 308 with regard to as many as three orthogonal axes (i.e., pitch, roll and yaw). The sensors can generate output signals which are then used to generate output control signals for a robotic system.

A hand operated user interface control 14 as described herein will advantageously include a mechanism to facilitate user control over the opening and closing operation of the grasping device 39. According to an aspect of the inventive arrangements, such a control can be integrated into the hand grip 302 in the form of a trigger control 312. For example, when the trigger control is depressed in a first direction 313 toward the hand grip 302, the fingers 52a, 52b of the grasping device can be caused to close. Conversely, when the trigger is released or moved away from the hand grip 302 (i.e., in a second direction opposite the first direction), the fingers 52a, 52b of the grasping device can be caused to open. The hand grip 302 can further include a user actuated sensor 310 such as a button, switch, knob or the like for selectively transitioning the control system 12 between one of at least two states, as discussed in more detail below. The term "button" as used herein is intended to encompass any suitable type of device, real or virtual, that enables the user to generate signals indicating the switching of the control unit into another state.

Figure 4:
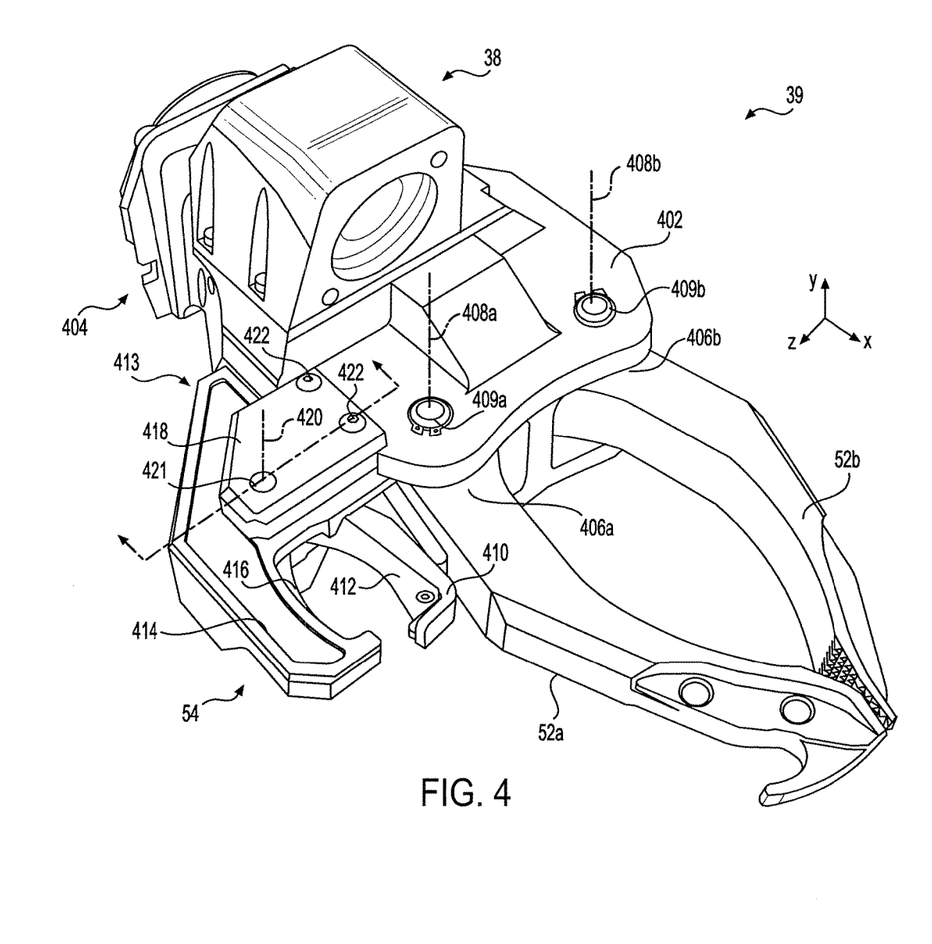
FIG. 4 is a drawing showing a grasping device and an associated cutting tool that is useful for understanding the inventive arrangements.
Figure 9:
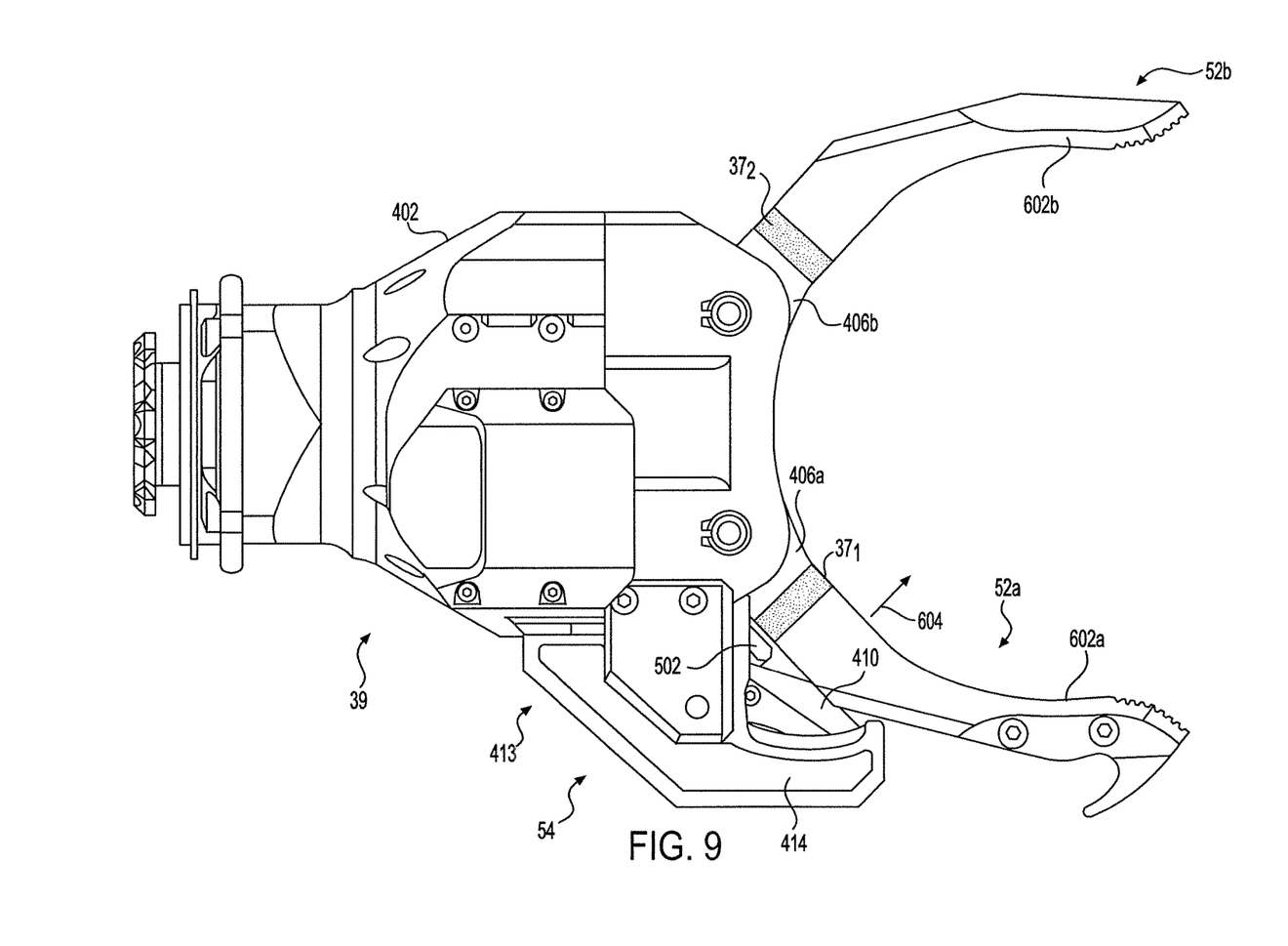
FIG. 9 is a drawing showing the grasping device in FIG. 4 with the fingers pivoted to a second open position.

Referring now to FIG. 4, an exemplary robotic grasping device 39 and attached cutting tool 54 will now be described in further detail. The grasping device 39 is comprised of a base 402 which has a coupler 404 that can be used to attach the grasping device to the manipulator 30. A video camera 38 can be disposed on the base 402 to facilitate visualization of items which are being grasped and/or manipulated. Grasping device fingers 52a, 52b are pivotally mounted to the base at a proximal end 406a, 406b so that each respective finger can pivot about a pivot axis 408a, 408b. The fingers can respectively pivot on pivot members 409a, 409b which are secured in the base. Actuators (not shown) that are disposed in the base 402 cause the fingers to pivot towards or away from each other responsive to robotic control signals. In FIG. 4, the grasping device fingers are shown in a closed position in which grasping fingers 52a, 52b are moved toward each other to a maximum extent. In FIG. 9, the fingers are shown in an open position in which the fingers are pivoted in opposite directions and away from each other to a maximum extent.

The cutting tool 54 can be a bypass type cutting tool in which a curved or straight blade 412 is movable past a blade 416 to perform a scissor-like motion that functions for cutting wires or other objects which are disposed between the blades. Alternatively, the cutting tool can be an anvil type cutter (not shown) in which a movable blade is aligned with an anvil surface (which can be a second blade) so that a crushing/cutting action is achieved when the blades are moved toward one another.

The cutting tool 54 is comprised of a main cutter housing 413. The main cutter housing is provided with a mounting bracket 418 to securely attach the cutting tool to a portion of the base 402. In some embodiments, the mounting bracket 418 can be integrally formed with the main cutter housing as shown. The cutting tool can be removably attached to the base by suitable means. For example threaded fasteners 422 can pass through openings 423 in the mounting bracket and extend into threaded apertures disposed in the base.

The main cutter housing 413 includes a first cutting jaw 414 which extends from the main cutter housing to rigidly support the blade 416 in a fixed position relative to the base 402. As shown in FIG. 4, the first cutting jaw and associated blade 416 can extend in a direction that is generally parallel to an extension of the fingers 52a, 52b. The first cutting jaw 414 and its associated blade 416 are also advantageously aligned with a plane defined by the first and second fingers 52a, 52b. A second cutting jaw 410 is pivotally mounted in the main cutter housing so that the blade 412 is movable in a pivot motion relative to the mounting bracket. For example, the second cutting jaw can be arranged to pivot on axial member 421 disposed in the main cutter housing. The second cutting jaw is biased by means of a resilient member 417 internal of the main cutter housing 413 to urge the second cutting jaw away from the first cutting blade. An exemplary resilient member that can be used for this purpose would include a spring. At one end, the spring can be anchored to an internal portion of the housing and an opposing end of the spring can be attached to the second cutting jaw 410. One or both of the blades 412, 416 can be integrally formed respectively with its associated cutting jaw 410, 414. However, the invention is not limited in this regard and in some embodiments, one or both of the blades can be removably secured to their respective support structure by means of suitable fasteners.

The axial member 421 defines a pivot axis 420 about which the second cutting jaw (including the blade 412) can pivot. Bearings 424 can be interposed between the axial member 421 and the second cutting jaw to facilitate its pivot motion as described herein. According to one aspect, the pivot axis 420 is generally aligned with each of the pivot axes 408a, 408b. The second cutting jaw pivots in a plane that is transverse to the pivot axis 420 and which is generally parallel to a plane through which the fingers 52a, 52b pivot. In some embodiments, the second cutting jaw can move in the same plane as is defined by the movement of the fingers. In such a scenario, the second cutting jaw 410 and its associated blade 412 can be generally aligned with a plane defined by the first and second fingers 52a, 52b.

Figure 5:
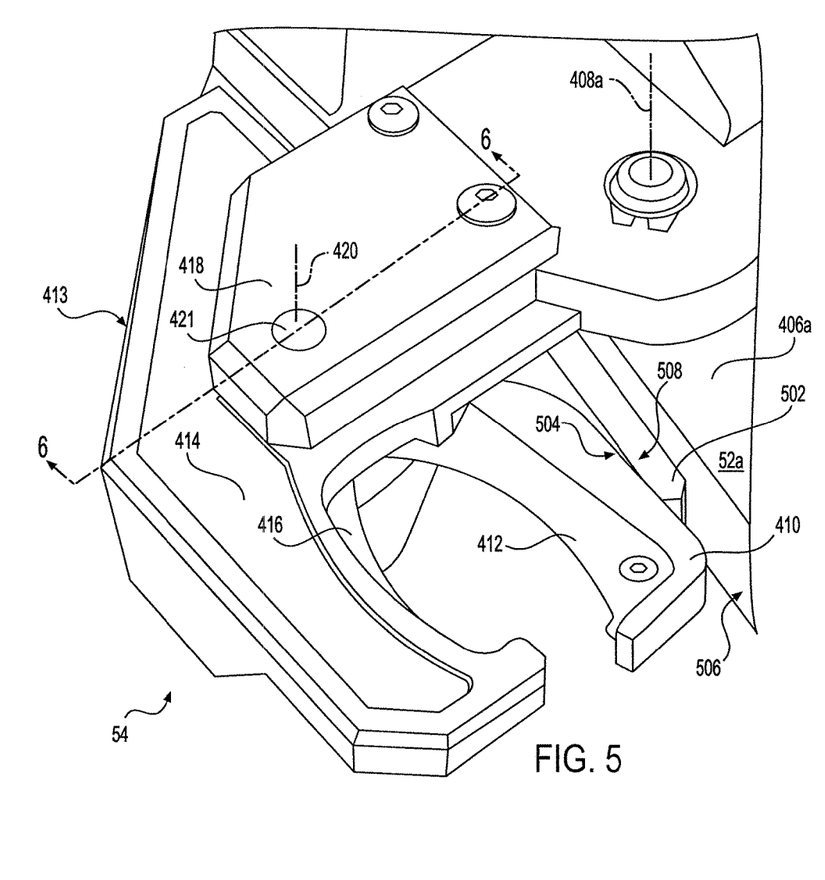
FIG. 5 is an enlarged view of the cutting tool in FIG. 4.
Figure 6:
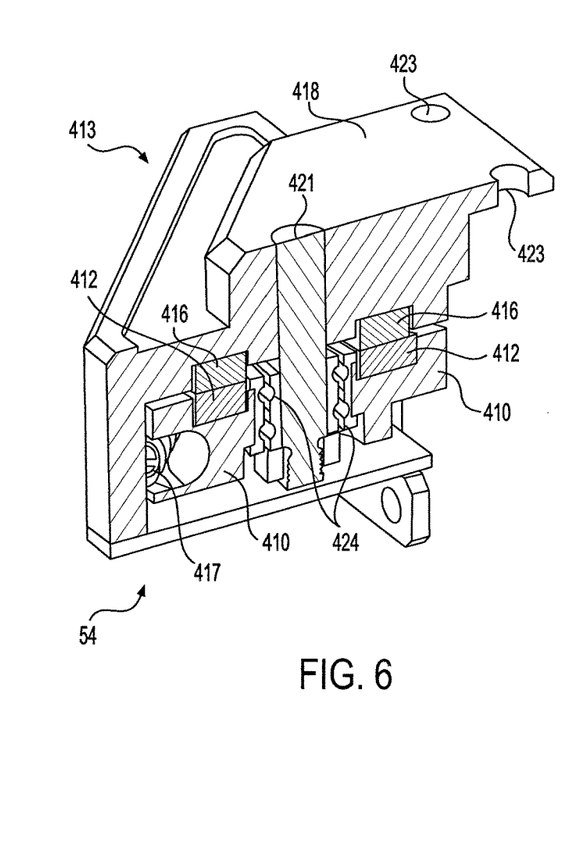
FIG. 6 is a cross-sectional view of the cutting tool in FIG. 5, taken along line 6-6.
Figure 10:
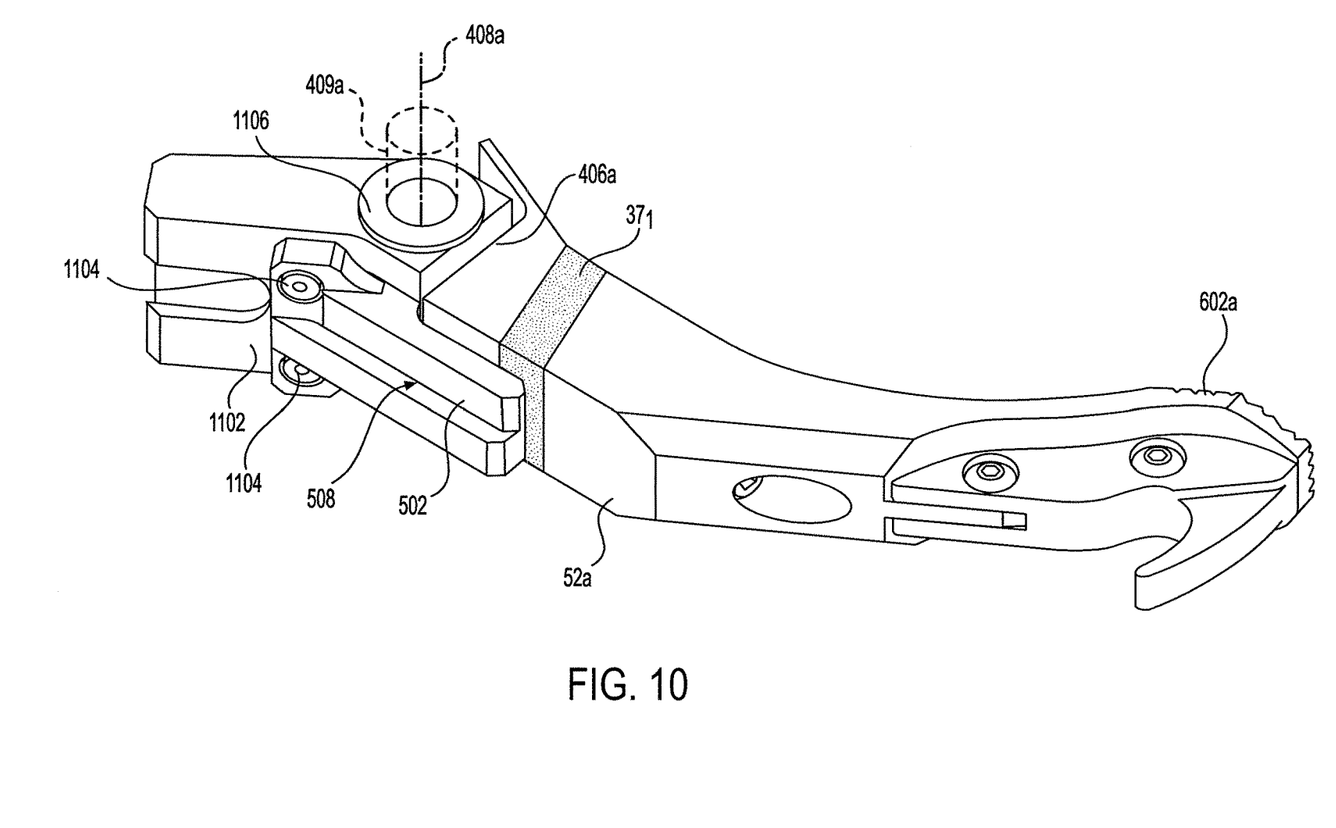
FIG. 10 is a drawing that is useful for understanding how a base portion of a shield member is secured to a proximal end of a robot finger.

As shown in FIG. 5, the second cutting jaw 410 can be disposed so it is adjacent to a finger 52a. An elongated rigid shield 502 is disposed between an exterior side wall 506 of finger 52a and a bearing surface 504 of the second cutting jaw. The shield is integrated into the base of finger 52a and moves with the finger. This arrangement can be accomplished by means of a rigid mechanical coupling between the base of the shield and the proximal end 406a of the finger 52a. An exemplary coupling between the base 1102 of the shield 502 and the proximal end 406a of the finger is shown in FIG. 10. As illustrated therein, a base portion 1102 of the shield 502 can be seated on the proximal end of the finger and secured there by suitable mechanical fasteners (e.g. screws) 1104 which are seated in threaded openings (not shown) disposed in the proximal end. A bushing 1106 can be provided to facilitate rotation of the finger on the pivot member 409a as shown.

Figure 8:
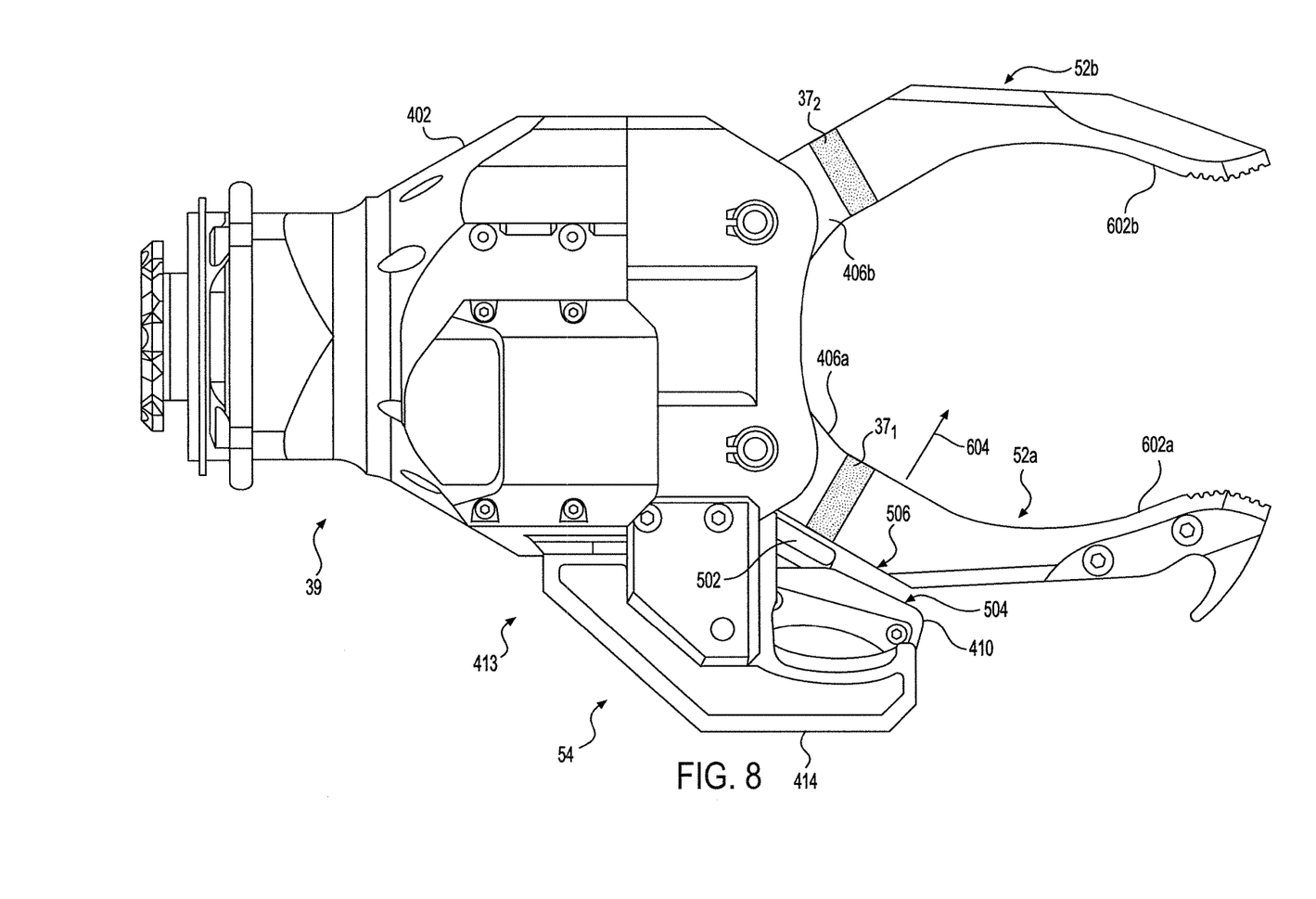
FIG. 8 is a drawing showing the grasping device in FIG. 4 with the fingers pivoted to a first open position.

Since the second cutting jaw 410 is resiliently biased away from the first cutting jaw it will urge bearing surface 504 toward bearing surface 508 associated with the shield. With an arrangement as shown and described, the shield limits and controls the spring biased tendency of the second cutting jaw to move in a direction toward the finger 52a. Moreover, movement of the shield in conjunction with the pivot movement of the finger 52a will indirectly control the pivot movement of the second cutting jaw 410. The second cutting jaw will move toward the first cutting jaw whenever the forces applied to the second cutting jaw by the shield are sufficient to overcome the spring bias. The interaction of the shield with the second cutting jaw can be observed in FIG. 8. Moving the finger 52a, 52b from a first position shown in FIG. 4 to an second position as shown in FIG. 8 causes the shield to progressively urge the second cutting jaw toward the first cutting jaw.

As the finger 52a continues to pivot away from finger 52b, there will come a point where the shield 502 no longer functions to isolate the finger 52a from the second cutting jaw 410. Instead, the exterior side wall 506 of the finger 52a will begin to directly contact the bearing surface 504 of the second cutting jaw. At this point the finger 52a will directly control the pivot motion of the second cutting jaw. This concept is illustrated in FIG. 9, which shows how the exterior side wall 506 of finger 52a bears directly upon the bearing surface 504 to urge the second cutting jaw toward the first cutting jaw. When the finger 52a is pivoted back toward the finger 52b, the spring bias force once again urges the second cutting jaw away from the first cutting jaw so it may return to the position shown in FIG. 4.

Figure 7:
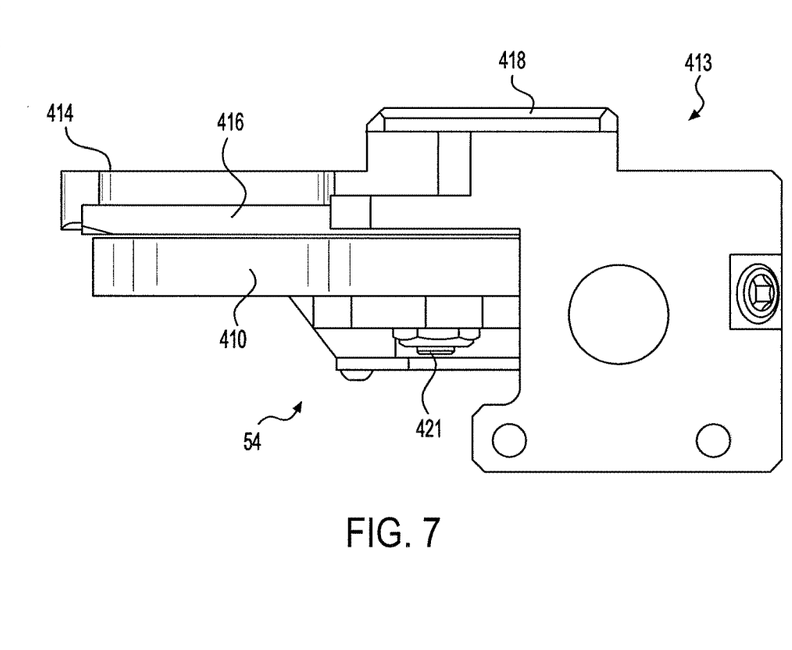
FIG. 7 is a side view of the cutting tool in FIG. 5, showing a side of the mechanism that is attached to the grasping device.

As noted above, a grasping device 39 includes a plurality of sensors $37_1$, $37_2$, . . . $37_k$, which can be used to measure forces exerted upon the grasping device. One or more of these force sensors $37_1$, $37_2$ can be operatively associated with fingers 52a, 52b to sense the amount of force being exerted upon the fingers. For example, the force sensors can be arranged to sense forces exerted upon each finger in three orthogonal directions (x, y and z). The information from the force sensors is used to provide haptic feedback to the remote operator. As shown in FIGS. 8 and 9, the force sensor $37_1$ associated with finger 52a can be located distal to the location where the shield 502 is secured to the finger 52a. The exact location is not critical but should be selected so that the force sensors $37_1$ will sense forces applied to the distal end of the finger 602a, but will not sense forces applied to the proximal end 406a of the finger. More particularly, the force sensor $37_1$ is advantageously arranged so that it will not sense forces applied to the finger 52a by the shield. Accordingly, when the shield engages the second cutting jaw as shown in FIG. 8, such interaction will not produce a change in force as measured by the sensor $37_1$. In contrast, the force sensor will detect a change in force when the exterior side wall 506 of finger 52a engages the second cutting jaw as shown in FIG. 7. This variation in the sensing activity of a finger force sensor $37_1$ is used advantageously to facilitate two separate operating modes involving the grasping device and the cutting tool.

Haptic Manipulation Mode

In a first operating mode the grasping device 39 is used in a manner similar to a conventional grasping device. Robot control signals are generated by the control system 12 using user interface control 14. The hand operated user interface control 14 can sense hand movement along one, two or three linear directions of motion defined by orthogonal axes x, y, and z so as to adjust a position of the grasping device. The user interface control can also control a rotation position of the grasping device (e.g. by using a movable hand grip 302). One or more sensors can detect rotational motion of the hand grip with regard to as many as three orthogonal axes (i.e., pitch, roll and yaw). A mechanism to control over the position of fingers 52a, 52b can be integrated into the hand grip 302 in the form of a trigger control 312.

When the trigger control 312 is depressed in a first direction 313 toward the hand grip 302, the fingers 52a, 52b of the grasping device can be caused to close by pivoting toward each other. Conversely, when the trigger control is released or urged away from the hand grip 302 (i.e., in a second direction opposite the first direction), the fingers 52a, 52b of the grasping device can be caused to open by pivoting away from each other. The hand grip can be arranged to provide haptic feedback for the operator in up to three orthogonal directions (x, y, z) based on force feedback information obtained from finger sensors $37_1$, $37_2$.

In this haptic manipulation mode, software associated with the control system 12 can be used to establish a control system defined maximum opening of the grasping device (as measured between the two fingers). The control system can receive finger position information from position sensors associated with the grasping device to determine when a predetermined maximum finger rotation has been achieved. Once this limit has been reached, the control system software and/or hardware can inhibit further pivot movement of the fingers in that direction. According to one aspect of the invention, the predetermined maximum finger rotation can be chosen to correspond approximately to the position of the fingers shown in FIG. 8. Such predetermined maximum finger rotation can be chosen so as to facilitate a maximum opening distance between the two fingers, which nevertheless avoids contact between the finger 52a and the second cutting jaw. This arrangement ensures that haptic feedback communicated to the operator will be based exclusively on forces associated with grasping objects in finger distal portions 602a, 602b, rather than upon any force feedback from the sensor produced by interaction between the finger 52a and the second cutting jaw.

Wire Cutting Mode

The hand grip 302 can include a user actuated sensor 310 such as a button, switch, knob or the like for selectively transitioning the control system 12 between one of at least two states. The haptic manipulation mode described above can be the first state. The second state is a wire cutting mode as hereinafter described. When in the wire cutting mode, the grasping device is caused to open to its mechanical maximum extent as depicted in FIG. 9. As will be appreciated from FIG. 9, this maximum mechanical extent is not the same as the control system defined maximum opening in FIG. 8. In some embodiments, the maximum mechanical extent as shown in FIG. 9 can be established by a mechanical interaction between the first and second cutting jaw, which prevents further pivot motion of the second cutting jaw (and finger 52a) when the maximum mechanical extent is reached.

When transitioning to the wire cutting mode, the operation of the trigger control 312 is automatically reversed by the control system 12. Pushing the trigger away from the hand grip 302 causes the fingers of the grasping device to close, by rotating toward one another. This action causes the cutting jaws 410 to rotate or pivot away from cutting jaw 414 to a position as shown in FIGS. 4 and 5. Accordingly, the cutting jaws of cutting tool 54 are caused to open as the fingers 52a, 52b close. Conversely, pulling the trigger toward the hand grip 302 causes the fingers 52a, 52b of the grasping device to pivot away from each other toward an open position. This action closes the jaws of the cutter as shown in FIG. 9 by causing the second cutting jaw 410 to move toward the first cutting jaw 414.

When operating in haptic manipulation mode, forces aligned in the x, y, and z orthogonal directions are communicated from sensors $37_1$, $37_2$ to control system 12 so that they can be used to generate haptic forces at the hand grip 302 in three dimensions. According to one aspect of the invention, when in the wire cutting mode, haptic force feedback is advantageously restricted only to the trigger control. Under such conditions, force information from the sensor $37_2$ is generally ignored, and force information form sensor $37_1$ is ignored unless it has components aligned with a cutting direction 604. Consequently, only those forces associated with the cutting operation are utilized, and such forces are experienced by an operator by means of haptic actuators that applying a haptic force through the trigger control.

When operating in accordance with the wire cutting mode, a wire is placed between the cutting jaws 410, 414 with the jaws in the position shown in FIGS. 4 and 5. At this point, if the user pulls the trigger control 312 toward the hand grip, the pivot action of finger 52a will cause the cutting jaw 410 to begin closing. As the cutting jaws begin closing, the finger 52a will reach a point in its rotation where exterior side wall 506 will begin to engage the cutting jaw 410. At this point, the sensor $37_1$ will begin sensing the application of force applied to the finger 52a. These sensed forces when communicated back to the control system 12 are used to generate haptic forces through the trigger. As cutting force applied by the cutting jaw is increased, an operator will sense an increasing level of haptic feedback force through the trigger control. This force will be applied through the trigger in a direction away from the hand grip, to simulate a feeling of resistance to the cutting operation. When the material of the wire is finally separated by the cutting action, the sensor $37_1$ will sense a sudden and rapid decrease in force being applied to the finger 52a. This sudden and rapid decrease in force will be communicated to the user through the haptic feedback actuator associated with the trigger control. The user will be able to sense that the wire has been cut.

The cutting jaw 410 is resiliently biased away from the cutting jaw 414. Accordingly, the sensor $37_1$ will detect such resilient bias forces when the finger 52a comes in contact with the cutting jaw. These pre-load forces associated with the cutting jaw can be automatically removed by the control system 12 so that an operator only experiences forces actually associated with the cutting operation. Removal of the resilient bias force can be accomplished by means of suitable software or hardware provided in the control system.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

We claim:

1. A robotic system, comprising:
a control system including a user interface device;
a slave device which is controlled by the control system, the slave device including
a robotic grasping device formed of a base and at least one finger which is movable to facilitate grasping of objects, the finger pivotally mounted to the base at a proximal end and having an elongated length which extends away from the rigid base to a distal end;
at least one sensor which senses a force applied to the finger; and
a cutting tool attached to the base of the robotic grasping device, the cutting tool including a first cutting jaw arranged to pivot on a pivot axis in a direction away from the finger of the robotic grasping device and towards a second cutting jaw when the finger applies a pushing force on the first cutting jaw;
wherein forces exerted on the first or second cutting jaw are sensed with the at least one sensor during a first predetermined range of finger motion associated with a cutting mode.

2. The robotic system according to claim 1, wherein the finger is sized and shaped to mechanically interact directly with a bearing surface of the first cutting jaw exclusively when said finger position corresponds to the first predetermined range of finger motion.

3. The robotic system according to claim 1, further comprising a resilient member which provides a bias force that urges the first cutting jaw toward the finger.

4. The robotic system according to claim 3, wherein the user interface device includes a user interface control element through which haptic forces are communicated to an operator responsive to forces measured by the sensor.

5. The robotic system according to claim 1, further comprising a shield arranged to mechanically interact with the first cutting jaw and selectively prevent the first cutting jaw from exerting a force on the finger during a second predetermined range of finger motion different from the first range, the second predetermined range of finger motion associated with a grasping mode.

6. The robotic system according to claim 5, wherein said control system is arranged to generate haptic control signals responsive to forces detected by the sensor, and wherein the user interface device is arranged to exert a haptic force upon an operator responsive to the haptic control signals.

7. The robotic system according to claim 6, wherein the direction of the haptic force applied to the human finger-operated trigger control by the control system responsive to the sensor is automatically reversed in the cutting mode as compared to the grasping mode.

8. The robotic system according to claim 5, wherein
the user interface device includes a hand grip with a human finger-operated trigger control and the robotic control system is selectively operable in each of the cutting mode and the grasping mode, and
the control system selectively generates finger control signals that cause the finger to pivot in a first direction responsive to pulling the trigger toward the hand grip when the control system is in the cutting mode, and pivot in a second direction, opposite the first direction, responsive to pulling the trigger toward the hand grip when the control system is in the grasping mode.

9. The robotic system according to claim 8, wherein the first direction is defined as a rotation of the finger toward the first cutting jaw, and the second direction is defined as a rotation of the finger away from the first cutting jaw.

10. The robotic system according to claim 5, wherein the shield is comprised of an elongated member that extends from the base between the finger and the first cutting jaw.

11. The robotic system according to claim 10, further comprising a mechanical coupling between said shield and said finger which causes the shield to rotate about a shield pivot axis in coordination with the pivot motion of the finger.

12. The robotic system according to claim 10, wherein the shield has a bearing surface which exerts a force upon a bearing surface of the cutting jaw in coordination with the pivot motion of the finger.

13. The robotic system according to claim 10, wherein the finger includes an intermediate portion extending between the proximal end and the distal end, and the mechanical interaction of the finger with the first cutting jaw occurs at the intermediate portion.

14. The robotic system according to claim 13, wherein the control system automatically adjusts the haptic forces communicated to an operator to inhibit those haptic forces resulting from sensing a spring bias force applied to the first cutting jaw.

* * * * *